United States Patent [19]
Jenkinson

[11] 3,791,758
[45] Feb. 12, 1974

[54] COOLING OF TURBINE BLADES

[75] Inventor: John Jenkinson, Bristol, England

[73] Assignee: The Secretary of State for Defence in Her Britannic Majesty's Government of the United Kingdom of Great Britain and Northern Ireland, London, England

[22] Filed: May 1, 1972

[21] Appl. No.: 249,140

[30] Foreign Application Priority Data
May 6, 1971 Great Britain.................. 14,172/71

[52] U.S. Cl. ............................................. 415/116
[51] Int. Cl. ............................................. F01d 5/08
[58] Field of Search... 415/115, 116; 416/97, 96, 95

[56] References Cited
UNITED STATES PATENTS

| | | | |
|---|---|---|---|
| 3,635,586 | 1/1972 | Kent et al. ......................... | 415/115 |
| 3,575,528 | 4/1971 | Beam, Jr. ............................ | 415/115 |
| 3,437,313 | 4/1969 | Moore ................................. | 416/95 |
| 3,224,194 | 12/1965 | De Feo et al. ..................... | 415/115 |
| 3,034,298 | 5/1962 | White ................................. | 415/116 |
| 2,988,325 | 6/1961 | Dawson ............................. | 415/115 |

Primary Examiner—Henry F. Raduazo
Attorney, Agent, or Firm—Stevens, Davis, Miller & Mosher

[57] ABSTRACT

The disclosure of this invention pertains to a gas turbine engine in which cooling air is blown from nozzles in a stationary structure into an annular array of inlet openings in a turbine rotor. The inlet openings lead to passages for supplying the cooling air to turbine blades. The passages are defined by radial walls extending downstream of the inlet openings and shaped to define splitters in respect of the flow through the inlet opening so that the latter is effectively a circumferentially continuous opening. Thereby diffusion of the flow from the nozzles to the openings is facilitated.

7 Claims, 7 Drawing Figures

COOLING OF TURBINE BLADES

This invention relates to the cooling of turbine rotor blades in gas turbine engines.

It is known in such engines to provide a rotor embodying the blades and situated in a position adjacent a hollow stationary structure axially separated from the rotor by a gap at least large enough to allow for thermally caused relative movement between them. To cool the blades cooling air is blown from the interior of the hollow structure through nozzles in a wall thereof across the gap and into inlet openings provided in the rotor. The openings lead to passages connected to cooling ducts in the blades. The nozzles are spaced apart circumferentially and the inlet openings are similarly spaced.

The effectiveness of the cooling of the blades depends, inter alia, on the static pressure of the cooling air in said passages because, for a given air temperature, the higher the static pressure at the entry to the relatively restricted cooling ducts in the blades the higher is the heat transfer per unit time from the blade material to the cooling air. However attempts to increase the static pressure of the cooling air supply have met certain problems arising in the main from the fact that, for a given pressure in the gap, the velocity of the cooling air is increased and its static pressure decreased. This reduction in static pressure must of course be recovered by subsequent retardation. The efficiency of this pressure recovery is dependent on retardation taking place at a relatively low rate and in conditions of steady flow. Any attempt to increase the pressure of the cooling air, and thereby improve the cooling of the blades, is increasingly dependent on said pressure recovery being efficient.

It is, of course, well known per se that pressure recovery can be effected efficiently by a diffuser, that is, a passage having gradually diverging walls. But such diffusers are necessarily passages of relatively great length and there is a difficulty of embodying diffusers in the rotor, the shape of which is dominated by considerations of the high centrifugal forces to which it is subject in operation.

It had not been appreciated in the past that the pressure recovery can take place at least partialy in said gap. However, even if this had been appreciated, the above-mentioned circumferential spacing of the nozzles and of the inlet openings leads to disturbance of the flow between the nozzles and inlet openings to an extent inconsistent with efficient pressure recovery.

More specifically, since the air leaves the circumferentially spaced nozzles in discrete jets separated by regions of lesser air velocity, any one inlet opening in the rotor is subject to alternating air velocities as the opening passes said jets. But, for a given rotor speed, it is only a given velocity vector across said gap which will satisfy the steady flow of air through the opening. Further, as the rotor rotates, any one of said discrete jets alternately meets an inlet opening and a blank wall of the rotor between adjacent openings. This leads to turbulence which is again inconsistent with the steady flow requirement of efficient pressure recovery.

According to this invention there is provided a gas turbine engine comprising a rotor including turbine blades, anf having an axis of rotation a hollow stationary structure situated adjacent the rotor and axially separately therefrom by a space, means provided in the hollow structure defining an annular nozzle concentric with said axis and arranged to communicate the interior of the hollow structure to said space, means provided in the rotor defining an annular arrangement of passages concentric with said axis, means provided in the rotor defining an annular arrangement of inlet openings arranged to confront the nozzle across said space and arranged to communicate the space to the passages, the rotor including radial walls cooperating to define the passage and having edge portions cooperating to define the inlet openings, the edge portions being shaped to define splitters in respect of flow across the space towards the inlet openings, and means defining cooling ducts provided in the blades and arranged to communicate with the passages.

The splitters ensure that the inlet openings are effectively an opening which is circumferentially continuous. This makes it possible for the cooling air to be transferred to the rotor under conditions of relatively steady flow thereby to allow efficient diffusion and pressure recovery.

Preferably the outlet openings are also arranged to be circumferentially continuous, or effectively so, to further improve pressure recovery.

An example of an engine according to this invention will now be described with reference to the accompanying drawings wherein.

Figure 1:
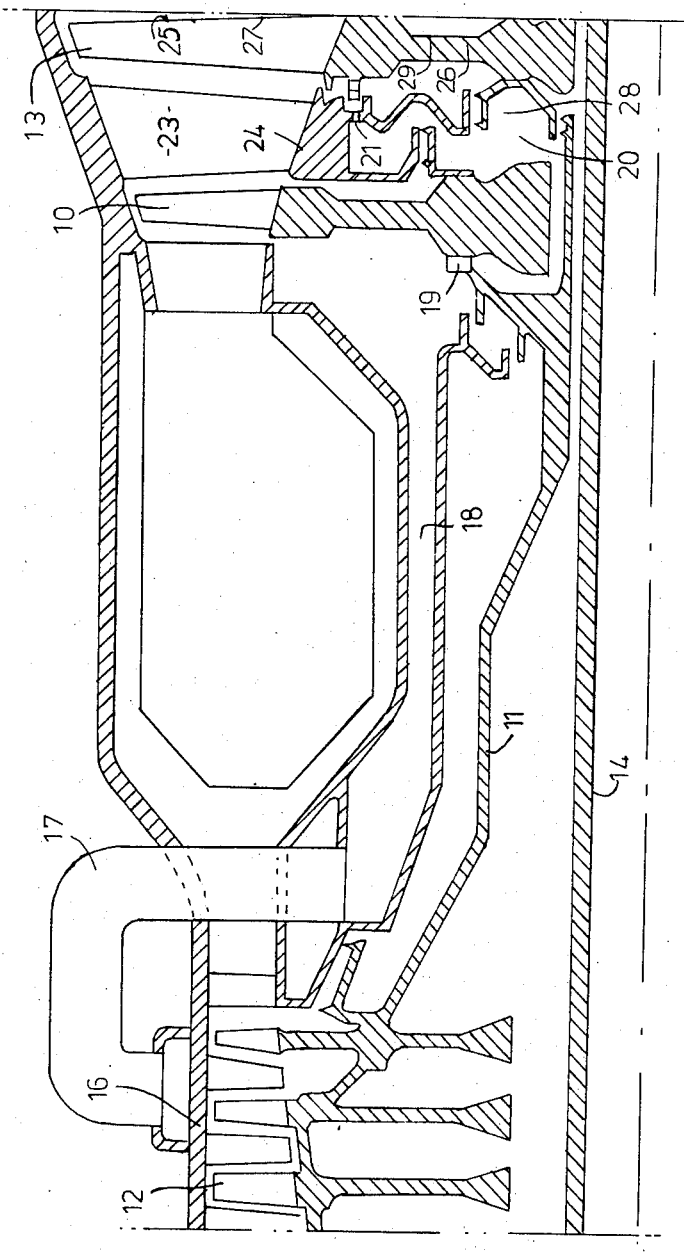
FIG. 1 is a sectional elevation of the portion of a gas turbine engine including said turbine assembly.
Figure 2:
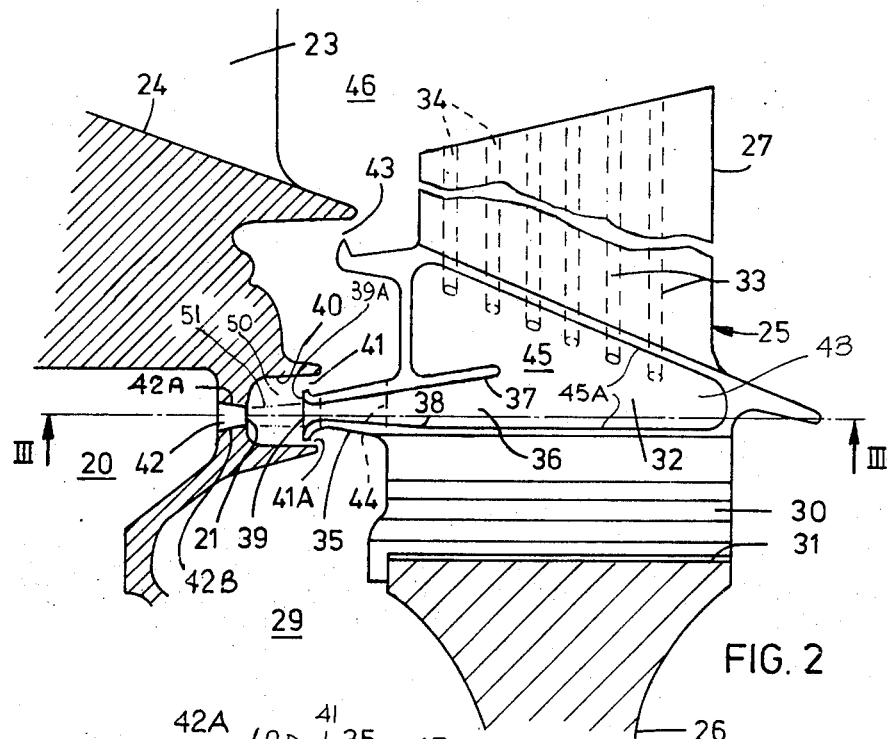
FIG. 2 is an enlarged detail of FIG. 1.

Referring to FIG. 1, the engine comprises a high pressure turbine 10 drivingly connected through a shaft 11 to a high pressure compressor 12, and a low pressure turbine 13 drivingly connected through a shaft 14 to a turbine 13 drivingly connected through a shaft 14 to a low pressure compressor not illustrated but well known per se. The compressor 12, whose main output is supplied to a combustion chamber 15, has a cooling air bleed outlet 16 connected through a pipe 17 and passages 18.19 to a cavity 20 adjacent the turbine 13.

The turbine 13 comprises stators 23 supporting a hollow stationary structure 24, whose interior includes a part of the cavity 20, and a wall 20A of which has outlet openings 21. The turbine 13 further comprises a rotor 25 in turn comprising a disc 26 and blades 27. The cavity 20 constitutes a supply of air for the cooling of the blades 27. Between the structure 24 and the rotor 26 there is provided a seal 28 through which air may pass from the cavity 20 into a space 29 for cooling the side of the rotor adjacent the structure 24. By virtue of the pressure drop across the seal 28 the static pressure in the space 29 is lower than the static pressure in the cavity 20.

Figure 3:
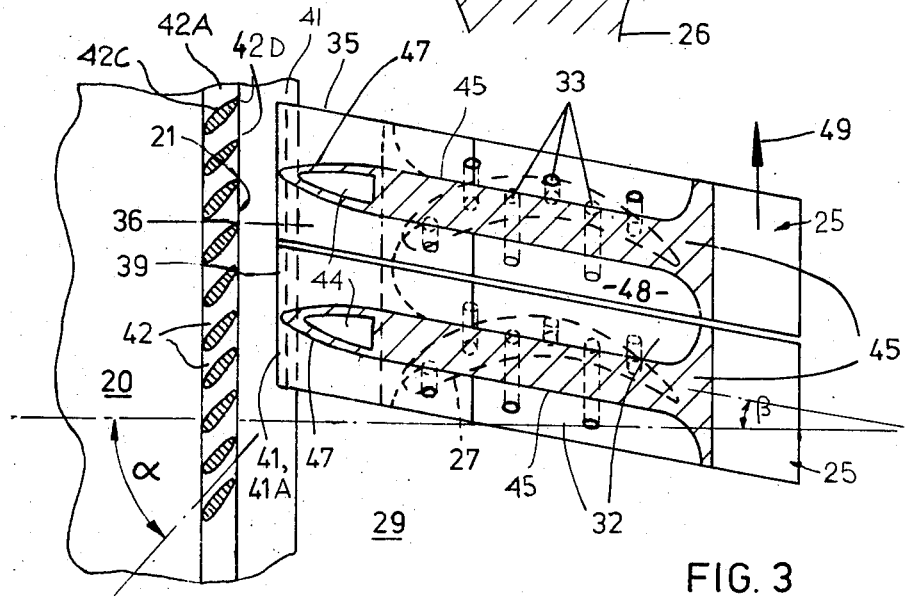
FIG. 3 is a section on line III—III on FIG. 2.
Figure 4:
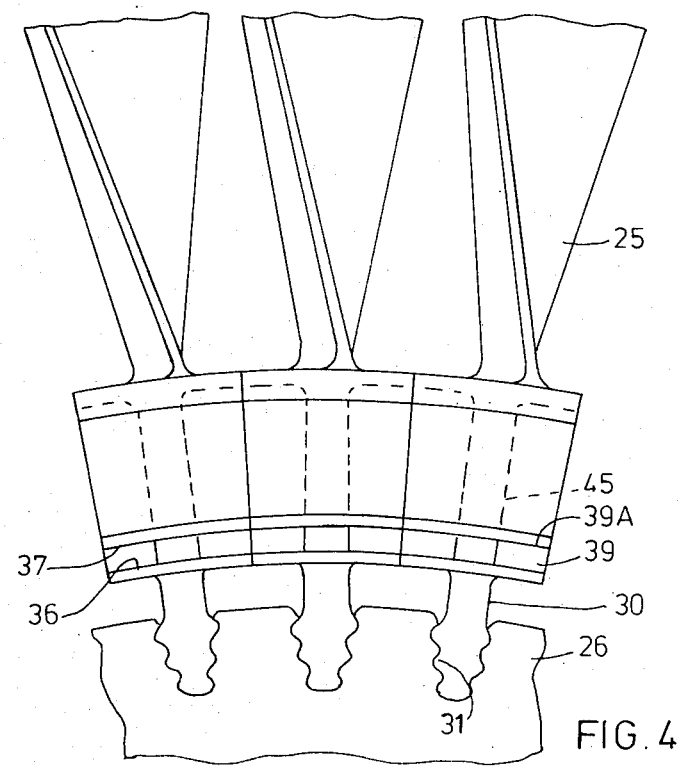
FIG. 4 is a view on the line IV—IV in FIG. 2.

Referring to FIGS. 2 to 5, the blades 27 each comprise a root portion 30 supported in an axial slot 31 in the periphery of the disc. Further, the root portion 30 includes a radial wall or rib 45 having transverse extensions 45A which between them define a recess 32 from which emanate ducts 33 for the distribution of cooling air from the recess 32 through the blade to the tip thereof where the ducts 33 have outlets 34 to the gas flow passage 46 of the turbine. The root portion 30 of each blade includes an extension 35 lying across the space 29, the extensions of the respective blades forming between them an annular extension of the rotor. The mutually confronting recesses 32 of any two adjacent root portions 30 form between them a passage 48 as seen in FIG.3. The passages 48 each have a diffuser portion 36 defined by divergent walls 37, 38. At the free extremity of the extension each passage 48 has an inlet opening 39 facing the outlet openings 21 of the stationary structure 24. The part of the space 29 directly between the openings 21, 39 defines a gap 50. The flow of cooling air across this gap is denoted 51.

The outlet openings 21 lie at the bottom of an annular groove 40 formed in the structure 24 and freely engaged by the free end portions of the extensions 35 so as to form together therewith aerodynamic seals 41, 41A.

Flow of air through the space 29 originates radially inside the extension 35 and exhausts through a seal 43 into the passage 46, this exhaust being radially outside the extensions 35. To enable the radial flow to pass the extensions 35 the latter are each provided with a radial passage 44.

The datum from which the pressures in the cavity 22 and space 29 are determined is the pressure in the passage 46 to which the two cooling flows are exhausted. The static pressure drop between the space 29 and the passage 46 has to be sufficiently high to ensure the flow necessary for cooling the disc 26 or at least to vent the space 29. Usually, the pressure in the space 29 is arranged not to be significantly higher than the pressure in the passage 46 to avoid losses through the seal 43. The static pressure drop from the passages 48 through the passages 33 to the passage 46 must be sufficiently high for the required rate of blade cooling. The static pressure in the space 29 must be less than that in the cavity 20 to ensure flow from the openings 21, but since the pressure in the space 29 is determined by different considerations than blade cooling, the pressure in the space 29 cannot be changed arbitrarily to satisfy the requirements of the blade cooling system. Thus if the pressure of the blade cooling air is to be raised, it would not normally be sensible to correspondingly raise the pressure in the space 29. Instead an increase in the pressure drop between the cavity 20 and 29 is accepted together with the consequent increase in velocity and fall in static pressure of the cooling air as passing from the outlet openings 21. However, to ensure efficient pressure recovery, the outlet and inlet openings 21, 39 are constructed to minimise turbulence.

Figure 5:
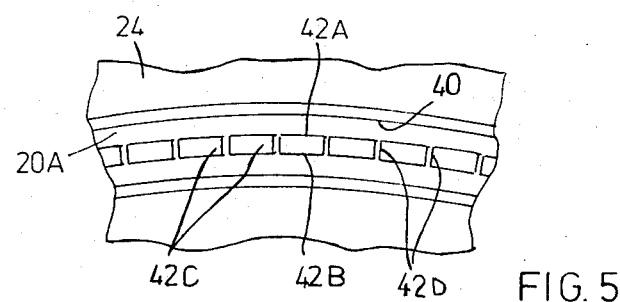
FIG. 5 is a view on the line V—V in FIG. 2.

As regards the openings 21, these are each defined by the smallest flow area or throat of a nozzle 42 of rectangular cross-section (FIG.5). The nozzles are ducts formed by circumferential walls 42A, 42B connected by vanes 42C which are convergent to terminate at single edges 42D (FIG.2) lying at the plane of the openings 21 so that the flows from the individual nozzles readily combine to form a circumferentially continuous stream. Therefore, the individual openings 21 of the nozzles may be regarded as constituting effectively a circumferentially continuous opening.

As regards the inlet openings 39, the extensions 35 each include a radial portion 47 being itself an extension of the adjacent rib 45.

The portions 47 are faired so as to have edge ends at the plane of the openings 39 (FIG. 3) thereby to define flow splitters in respect of flow into the opening 39. In view of the these splitters, the flow can enter the openings 39 without significant turbulence and these openings are therefore effectively a circumferentially continuous opening. The ribs 45 are loadbearing members of the blade root portion because they transmit the centrifugal force of the blade to the connection with the disc 26. The purpose of the extensions 35 is partly to make it possible to provide the faired extensions 47 without weakening the ribs and partly to avoid the difficulty of having to find space for the whole of the relatively long diffuser within the normal axial extent to the blade. Further, the extension 35 makes it possible to introduce the passages 44 and thereby make possible radial flow of the air in the space 29 along paths clear of the gap 50 so that flow across this gap is not disturbed by said radial flow.

The seals 41, 41A further protect the gap 50 against radial flow in the space 29. In this connection, it will be seen that the inevitable pressure drop across the passages 44 results in that the static pressure in the part of the space 29 radially outside the extensions 35 is less than in the part radially inside these extensions. Therefore the gap 50 has a different pressure relationship with these two parts of the space 29. At least the seal 41 is desirable to compensate for this difference.

The ribs 45 have an angle B relative to the axis of the rotor and determined by the anglular position of the blade aerofoil in accordance with practice well-known per se. To ensure that the flow from the nozzles 42 enters the passages 48 in the direction of the ribs, the nozzles are arranged at angles and so that the velocities of the flow from the nozzle and of the flow along the ribs and the circumferential velocity, denoted by an arrow 49, of the ribs form between them a satisfactory velocity triangle to provide for conditions of steady flow from the nozzles 42 into the passages 48.

Given the above-mentioned conditions of steady flow across the gap 50, the presence of the inlet openings 39 causes the flow 51 from the outlet openings 21 to diffuse and thereby to attain an increase of static pressure. To this end the minimum flow area of the inlet openings 39 should be larger than that of the outlet openings 21 but not unduly so, and it is preferable to provide the openings with convergent entry portions 39A (FIG. 2) to capture as much of the diffusing flow as possible. This feature is shown more clearly in FIG.6 to be described later herein.

The process of diffusion in the gap 50 is one which will be understood by aerodynamicists and the exact dimensions of the openings are to some extent a matter of experiment. Fifty per cent of the possible pressure recovery can readily be achieved in the gap 50, and it is theoretically possible to achieve the whole of the possible pressure recovery in the gap 50 so that the diffusers 36 could virtually be dispensed with. The diffusers 36 themselves are not necessary for diffusion to take place in the gap 50 and the walls 37, 38 could therefore be parallel. However, in practice it is convenient to include the diffusers 36 and thereby ease the conditions for diffusion in the gap 50.

Figure 6:
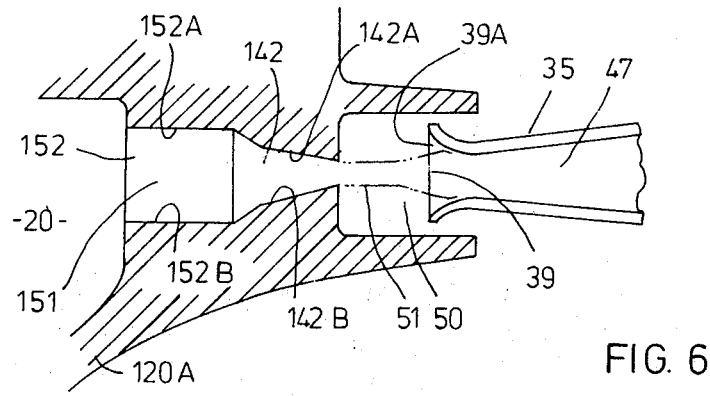
FIG. 6 shows a detail of FIG. 2 to an enlarged scale and embodying a modification.
Figure 7:
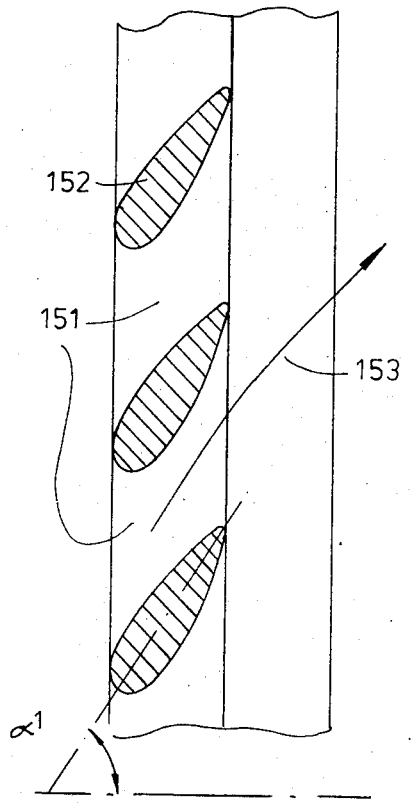
FIG. 7 is a section on the ine VII—VII in FIG. 6.

Referring to FIGS. 6 and 7, a nozzle in the form of an annular groove 142 is defined by convergent walls 142A, 142B and has an outlet opening 121 defining a nozzle throat which is circumferentially continuous. Upstream of the nozzle 146 there is provided in the wall of the stationary structure a series of passages 152 defined by walls 152A, 152B connected by vanes 152C. The nozzle 146 has a turning effect on the flow as shown by an arrow 153. It is therefore necessary for the vanes 152C to be at an angle and which is correspondingly larger than the angle and of the vanes 42C (FIG. 3).

The modification shown in FIGS. 6, 7 differs from the construction shown in FIGS. 2 to 5 only as regards convenience of manufacture. The nozzles 42, being relatively small individual passages, are expensive to make accurately whereas the nozzle 142, being circumferentially continuous, can be machined relatively easily. The passages 152 are large compared with the nozzles 42 and need not be as accurately dimensioned as the nozzles 42; there is therefore a lesser difficulty of manufacture. The nozzle 142 has an outlet opening 121 corresponding to the outlet openings 21 of FIGS. 2 to 5. The gap 50 and the extension 35 shown in FIG.6 are the same as those shown in FIGS. 2 to 5.

FIG.6 also shows in greater detail the nature of the flow across the gap 50. The inlet opening 39 is defined by the leading edges of the flow splitters 47 and of the convergent entry portions 39A. The flow 51 is shown to spread against the entry portion 39A and then to converge, i.e. accelerate slightly to pass into the diffuser 36.

We claim:

1. Gas turbine engine comprising a rotor including turbine blades, and having an axis of rotation, a hollow stationary structure situated adjacent the rotor and axially separated therefrom by a space, means provided in the hollow structure defining an annular nozzle concentric with said axis and arranged to communicate the interior of the hollow structure to said space, means provided in the rotor defining an annular arrangement of passages concentric with said axis, means provided in the rotor defining an annular arrangement of inlet openings arranged to confront the nozzle across said space and arranged to communicate the space to the passages, the rotor including radial walls cooperating to define the passages and having edge portions cooperating to define the inlet openings, the edge portions being shaped to define splitters in respect of flow across the space towards the inlet openings, and means defining cooling ducts provided in the blades and arranged to communicate with the passages.

2. Engine according to claim 1, the rotor comprising an annular extension projecting toward the stationary structure, the inlet openings being defined by the extension at the free end thereof and the extension including said splitters, and means defining passages extending radially through the splitters between parts of said space lying respectively radially inside and outside said extension.

3. Engine according to claim 2, each said blade comprising a root portion including a said radial wall, the wall having an extension projecting towards the stationary structure, the extension being shaped to define a said splitter, and the root portion including walls extending transversely to the radial wall; wherein the ribs, the extensions and the walls of the respective blades cooperate to define between them said inlet openings and passages.

4. Engine according to claim 1, the rotor comprising circumferentially arranged walls cooperating with the splitters and with the radial walls to define said passages, and wherein the circumferential walls are divergent in the direction away from the inlet opening to define diffusers.

5. Engine according to claim 1, the stationary structure including a wall arranged between the interior of the structure and said space, the wall being shaped to define a circumferentially continuous annular outlet opening to said space, the wall further including means defining radially spaced apart annular surfaces which are circumferentially continuous and which are mutually convergent toward and terminating at said opening, the surfaces defining said nozzle, and the wall including duct means for communicating the interior of the structure to the nozzle.

6. Engine according to claim 1, the stationary structure including a wall separating the interior of the structure from said space, means provided in the wall defining radially spaced apart annular surfaces which are mutually convergent toward said space, vanes connecting said surfaces, the surfaces and vanes defining between them nozzle ducts communicating the interior of the hollow structure to said space, the vanes each having an edge portion shaped to be convergent toward said space and to terminate at a single edge extending between the surfaces and cooperating therewith to define a nozzle throat.

7. Gas turbine engine comprising a rotor including turbine blades and having an axis of rotation, a hollow stationary structure situated adjacent the rotor and axially separated therefrom by a space, means provided in the hollow structure defining an annular nozzle concentric with said axis and arranged to communicate the interior of the hollow structure to said space, the rotor including two radially spaced apart circumferential walls and radial walls extending between the circumferential walls and cooperating therewith to define an annular array of passages concentric with said axis, the circumferential and radial walls further defining in respect of each passage an inlet opening therefor confronting the nozzle and arranged to receive airflow therefrom, the radial walls having edge portions shaped to define splitters in respect to said flow, the circumferential walls being divergent in the direction away from the inlet openings to define diffusers, and means defining cooling ducts provided in the blades and arranged to communicate with the passages.

* * * * *